United States Patent
Yasuna et al.

(10) Patent No.: US 6,906,884 B2
(45) Date of Patent: Jun. 14, 2005

(54) MAGNETIC DISK APPARATUS AND ITS SERVO SIGNAL RECORDING METHOD

(75) Inventors: Kei Yasuna, Chiyoda (JP); Takashi Yamaguchi, Tsuchiura (JP); Kenichiro Sugiyama, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 418 days.

(21) Appl. No.: 10/054,794

(22) Filed: Jan. 25, 2002

(65) Prior Publication Data

US 2003/0043494 A1 Mar. 6, 2003

(30) Foreign Application Priority Data

Aug. 30, 2001 (JP) .................................. 2001-261487

(51) Int. Cl.$^7$ .............................................. G11B 21/02
(52) U.S. Cl. ...................................................... 360/75
(58) Field of Search .......................................... 360/75

(56) References Cited

U.S. PATENT DOCUMENTS 6,040,955 A * 3/2000 Brown et al. .................. 360/75

FOREIGN PATENT DOCUMENTS

WO            96/28814        9/1996    ........... G11B/5/596

* cited by examiner

Primary Examiner—David Hudspeth
Assistant Examiner—Mitchell Slavitt
(74) Attorney, Agent, or Firm—Antonelli, Terry, Stout & Kraus, LLP

(57) ABSTRACT

A magnetic disk apparatus includes an actuator for moving a head to a position above the magnetic disk in a servo track movement operation, a range limiter for limiting a movable range of the actuator, a range specifier for setting a specific range of the actuator in the movable range of the actuator, and a control unit. The control unit enables writing a servo signal into the specific range at servo track movement pitch based on servo tracks recorded with the servo signal, correcting the servo track movement pitch on the basis of the number of servo tracks in the specific range and executing control to write the servo signal at corrected servo track movement pitch.

9 Claims, 4 Drawing Sheets

MAGNETIC DISK APPARATUS AND ITS SERVO SIGNAL RECORDING METHOD

FIELD OF THE INVENTION

The present invention relates to a magnetic disk apparatus and its servo signal recording method. More particularly, the present invention relates to a magnetic disk apparatus having a self servo write function for recording a servo signal for positioning a head at a predetermined location on a magnetic disk without using an external write apparatus and relates to a servo signal recording method adopted by the magnetic disk apparatus.

BACKGROUND OF THE INVENTION

A self servo write method is disclosed in International Publication No. WO96/28814 (corresponding to Japanese Patent Laid-Open No. Hei10-504128) as a method adopted in a conventional magnetic disk apparatus. This method adopts a technique of setting a gap between servo tracks on which data is recorded. In accordance with this self servo write method, the magnetic disk apparatus itself records a pattern by using a head provided therein and sets a pitch of the head movement by using the amplitude of a signal for generating this pattern as a base.

In the conventional magnetic disk apparatus, however, the width of a recording/reproducing device of the head provided for the magnetic disk apparatus exhibits hard variations even if the amplitude of a reproduction signal is set at a uniform level. These hard variations exhibited by the recording/reproducing device of the head cause gap variations in actual servo tracks of the magnetic disk apparatus. In turn, these variations in gap cause the number of servo tracks written onto magnetic disk surfaces to vary even if the surfaces have the same size. Thus, the conventional magnetic disk apparatus has a problem that it is impossible to verify whether required servo tracks have been written, that is, whether a servo signal has been recorded successfully, before verification of the number of servo tracks after the operation to record the servo signal onto the entire surface of the magnetic disk. Particularly, in the case of tracks laid out at pitch smaller than a track width by several hundreds of nm as is the case with a contemporary magnetic disk apparatus, the effect of dimensional variations of the recording/reproducing device is bigger. Thus, the number of operations to rerecord the servo signal increases. As a result, there is raised a problem that the throughput for an operation to record a servo signal decreases considerably.

It is thus an object of the present invention addressing the problems described above to provide a magnetic disk apparatus capable of writing a servo signal without using an external write apparatus and capable of recording a predetermined servo signal onto the surface of a magnetic disk with a high degree of reliability and a high degree of efficiency even if dimensional variations of a recording/reproducing device of a head exist, and provide a servo signal recording method adopted by the magnetic disk apparatus.

SUMMARY OF THE INVENTION

In order to achieve the object described above, in accordance with a first aspect of the present invention, there is provided a magnetic disk apparatus comprising: a head having a recording/reproducing device for writing and reading out a servo signal onto and from a magnetic disk; an actuator for moving the head to a position above the magnetic disk in a servo track movement operation; a range limiting means for limiting a movable range of the actuator; a range specifying means for setting a specific range of the actuator in the movable range of the actuator; and a control means for writing a servo signal into the specific range at servo track movement pitch based on servo tracks recorded with the servo signal, correcting the servo track movement pitch on the basis of the number of servo tracks recorded with the servo signal in the specific range and executing control to write the servo signal at corrected servo track movement pitch.

In accordance with a second aspect of the present invention, there is provided a servo signal recording method for recording a servo signal into a specific range of a magnetic disk in a magnetic disk apparatus comprising a head having a recording/reproducing device for writing and reading out the servo signal onto and from the magnetic disk and an actuator for moving the head to a position above the magnetic disk in a servo track movement operation. The servo signal recording method comprises the steps of: writing the servo signal into the specific range at servo track movement pitch based on servo tracks recorded with a servo signal; detecting the number of servo tracks recorded with a servo signal in the specific range; comparing the detected number of servo tracks recorded with a servo signal with a set value; correcting the servo track movement pitch at which the servo signal is written into the specific range on the basis of a comparison result; and writing the servo signal at corrected servo track movement pitch.

DETAILED DESCRIPTION OF THE PREFERRED EMBODIMENTS

Figure 1:
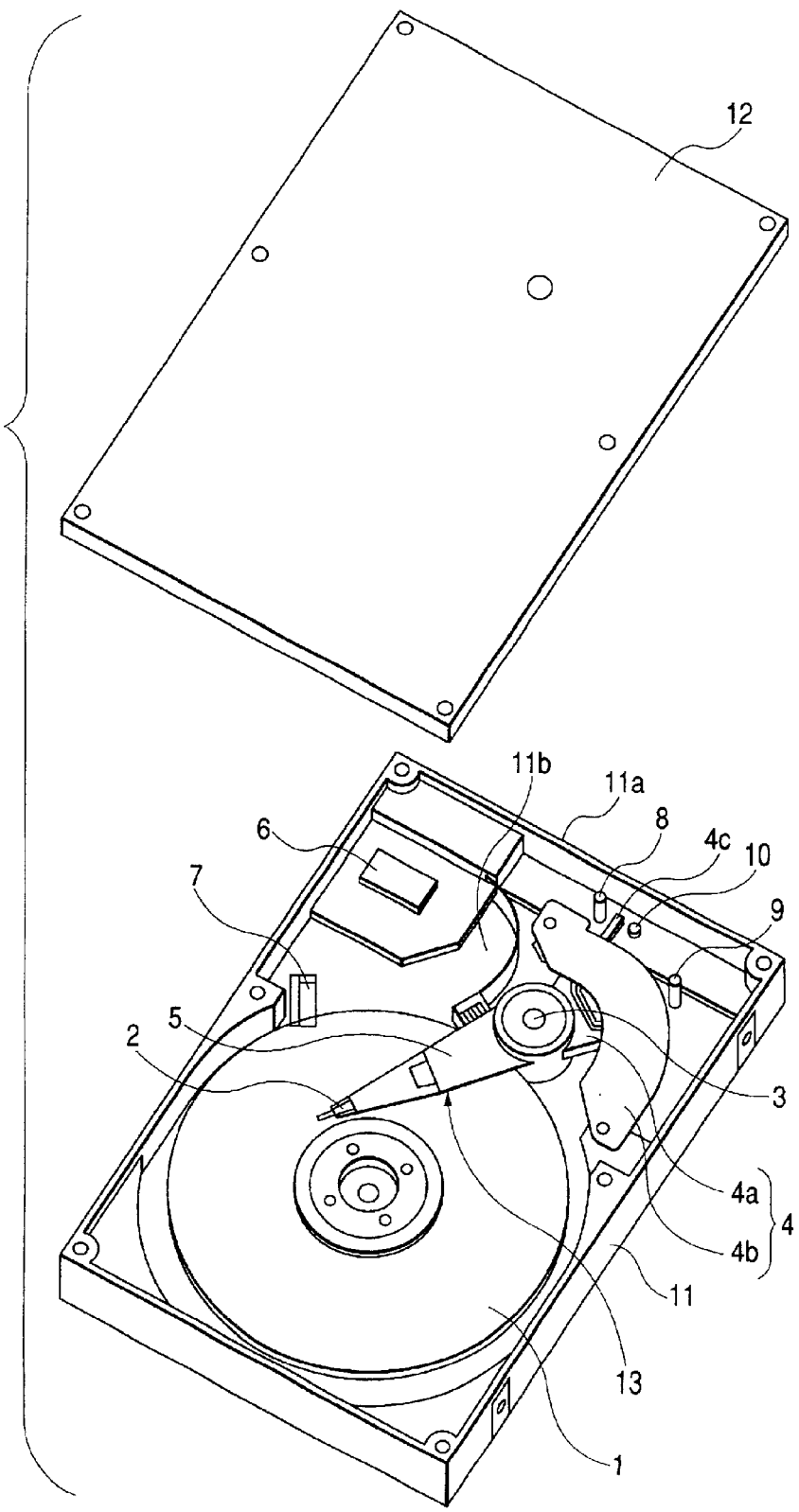
FIG. 1 is an exploded perspective view of a magnetic disk. apparatus provided by a first embodiment of the present invention.

Preferred embodiments of the present invention are explained by referring to the diagrams as follows. It should be noted that a second embodiment's components identical with those employed in a first embodiment are no longer shown in diagrams and explanations of such identical components are not given in the description of the second embodiment to avoid duplication. Components common to both the embodiments and equivalent components shared by both the embodiments are denoted by the same reference numerals used in the first embodiment.

First of all, the first embodiment of the present invention is explained by referring to FIGS. 1 to 4.

An overall configuration of this embodiment is explained by referring to FIG. 1.

A circular medium serving as a magnetic disk 1 for recording information is mounted on a spindle motor provided at the center of a case 11, and rotated at a high speed. The case 11 is a thin rectangular cabinet having a side wall 11a and a bottom wall 11b. A case cover 12 is mounted on the top surface of the case 11 to provide a hermetically sealed space inside the case 11.

A head 2 for recording and reproducing a servo signal and information onto and from the magnetic disk 1 is mounted at the end of a head arm 5. The head arm 5 is supported in such a way that the head arm 5 can be moved in a rotation centered at a pivot 3. An actuator driving device 4 comprises an actuator movable unit 4a, which is a needle having a coil, and an actuator fixed unit 4b implemented by a magnetic stationary part. The actuator movable unit 4a is supported in such a way that the arm 4a can be moved in a rotation centered at the pivot 3. An actuator 13 comprises the head arm 5, the pivot 3 and the actuator driving device 4.

In such a configuration, the head 2 is supported by the pivot 3 through the head arm 5 and driven by the actuator driving device 4 to move in a radial direction to any arbitrary position on the magnetic disk 1. The head 2 is driven in accordance with a signal generated by a driver IC 6 to implement recording and reproducing operations. The driver IC 6 and other controllers not shown in the figure constitute a control unit. That is, the head 2 is controlled and driven by the control unit through the driver IC 6. When no recording and reproducing operations are carried out, the head 2 is saved at a ramp mechanism 7 located on the outer side of the magnetic disk 1, hence, being held in state of being separated away from the surface of the magnetic disk 1.

On the actuator movable unit 4a, a stopper contact unit 4c is created as an integrated part of the actuator movable unit 4a, protruding from an outer circumference of the actuator movable unit 4a. It should be noted that the actuator movable unit 4a can also be created as a member separated from the actuator movable unit 4a. An inner circumference side stopper 8 and an outer circumference side stopper 9 are each created as an integrated part of the bottom surface of the case 11, protruding from the bottom surface's location in a rotational range of the stopper contact unit 4c. The inner circumference side stopper 8 and the outer circumference side stopper 9 form a range limiting means for limiting a movable range of the actuator 13. Concretely, the range limiting means limits a movable range of the stopper contact unit 4c. That is, the range limiting means is set so that, when the stopper contact unit 4c is brought into contact with the inner circumference side stopper 8, the head 2 is positioned on the innermost circumference of the magnetic disk 1 and, when the stopper contact unit 4c is brought into contact with the outer circumference side stopper 9, the head 2 is positioned on the outermost circumference of the magnetic disk 1. It should be noted that the inner circumference side stopper 8 and the outer circumference side stopper 9 can also be implemented as members separated from the case 11.

An intermediate stopper 10 is provided in the rotational range of the stopper contact unit 4c at a position between the inner circumference side stopper 8 and the outer circumference side stopper 9. In conjunction with the inner circumference side stopper 8, the intermediate stopper 10 sets a specific range in which the actuator 13 can be moved. Concretely, the inner circumference side stopper 8 and the intermediate stopper 10 sandwich a specific range in which the stopper contact unit 4c can be moved. That is, when the stopper contact unit 4c is brought into contact with the inner circumference side stopper 8, the head 2 is positioned at the innermost circumference of the magnetic disk 1 and, when the stopper contact unit 4c is brought into contact with the intermediate stopper 10, the head 2 is positioned at an intermediate circumference of the magnetic disk 1. The specific range of the stopper contact unit 4c is the movable range of the stopper contact unit 4c between the inner circumference side stopper 8 and the intermediate stopper 10. Since the inner circumference side stopper 8 is used as one of means for defining both the movable range and the specific range of the stopper contact unit 4c as described above, the number of servo tracks in the specific range can be detected by using an inexpensive configuration and with a high degree of precision. In addition, since the specific range is placed on the innermost circumference side of the magnetic disk 1, recording of servo tracks in the specific range can be detected quickly so that the servo track movement pitch can be corrected early with a high degree of efficiency on the basis of the number of detected servo tracks recorded with a servo signal.

Figure 2:
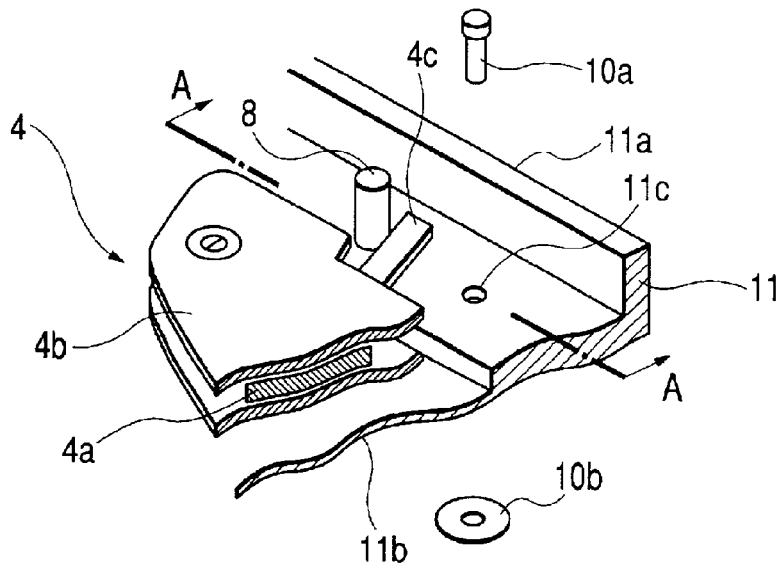
FIG. 2 is a perspective view of a cross section of components constituting the magnetic disk apparatus.
Figure 3:
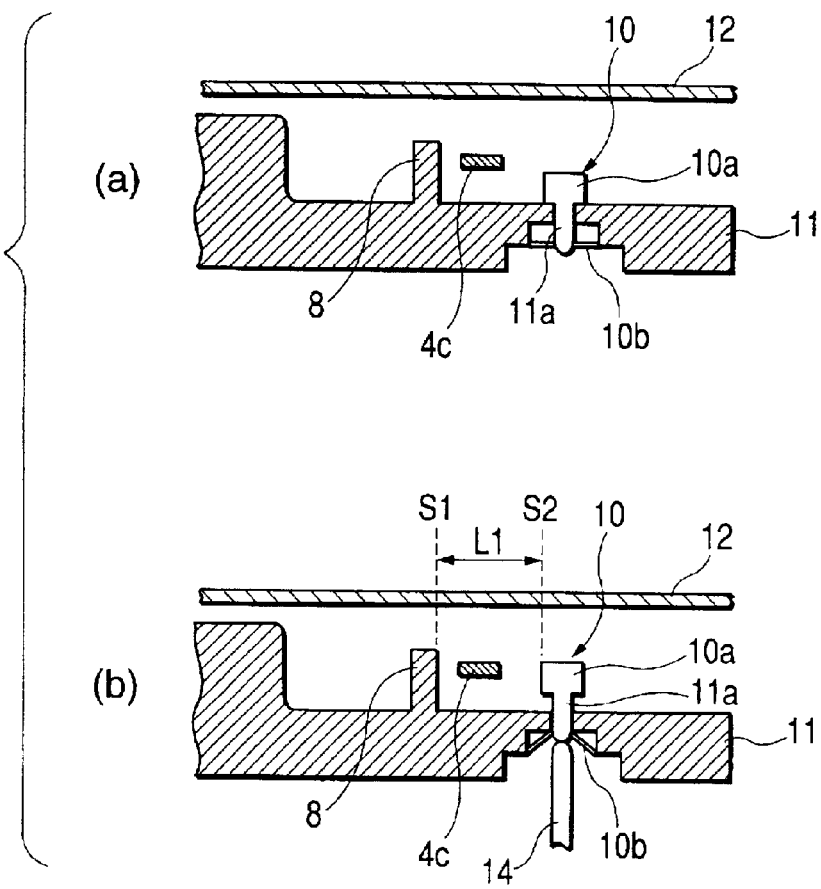
FIG. 3 is an explanatory diagram used for describing operations taking place on a cross section A—A shown in FIG. 2.

The following description explains concrete configurations and operations of the inner circumference side stopper 8, the outer circumference side stopper 9 and the intermediate stopper 10 by referring to FIGS. 2 and 3.

When the head 2 is positioned on the innermost circumference of the magnetic disk 1, the stopper contact unit 4c forming a portion of the actuator movable unit 4a is brought into contact with the inner circumference side stopper 8 to limit a further movement of the head 2. When the head 2 is moved from the position on the innermost circumference in the radial direction to an outer circumference by 1 step, the stopper contact unit 4c is brought into contact with a pin 10a of the intermediate stopper 10 to limit a further movement of the head 2 provided that the pin 10a has been set in a state of protruding upward. In this way, the movement of the stopper contact unit 4c is confined in the specific range between the inner circumference side stopper 8 and the intermediate stopper 10.

The intermediate stopper 10 comprises the pin 10a, which the stopper contact unit 4c comes in contact with, and a diaphragm like elastic member 10b. One end of the pin 10a is supported by the diaphragm like elastic member 10b positioned outside the case 11 through a hole 11c bored through the case 11. The diaphragm like elastic member 10b allows the pin 10a to move in a direction normal to the surface of the magnetic disk 1 while maintaining the hermetical sealing of a space inside the case 11.

FIG. 3(a) is a diagram showing a state of the intermediate stopper 10 with the magnetic disk apparatus put in an ordinary operation. In the ordinary operation, the pin 10a is held in a state of being pulled downward by a force applied by the diaphragm like elastic member 10b. In this state, the upper end of the pin 10a is located at a position below the bottom of the stopper contact unit 4c so that the stopper contact unit 4c is never brought into contact with the pin 10a. As a result, the movable range of the stopper contact unit 4c is not limited by the pin 10a.

On the other hand, FIG. 3(b) is a diagram showing a state of the intermediate stopper 10 in an operation to record a servo signal. When a servo signal is recorded, the head 2 is loaded on the magnetic disk 1 and moved to the innermost circumference of the magnetic disk 1. At the stage the head 2 is moved to the innermost circumference, a pushing member 14 is lifted from an external position, pressing the pin 10a in the upward direction. This operation places the pin 10a at a position at which the stopper contact unit 4c can come in contact with the pin 10a. As a result, the movement of the stopper contact unit 4c is limited within a range defined by an area L1.

The position, at which the stopper contact unit 4c can come in contact with the pin 10a, can be any position as long as the head 2 is located in a data area of the magnetic disk 1. As far as the dimensional precision of the inner circumference side stopper 8 and the dimensional precision of the intermediate stopper 10 are assured, however, it is desirable to place the pin 10a at a position close to the inner circumference side stopper 8 for a reason to be described later. Taking the precision and the efficiency into consideration makes it desirable to set the specific range L1 of the stopper contact unit 4c at a size smaller than 30% of the total write area of the servo signal. A specific range L1 equal to about 20% of the total write area is optimal.

Figure 4:
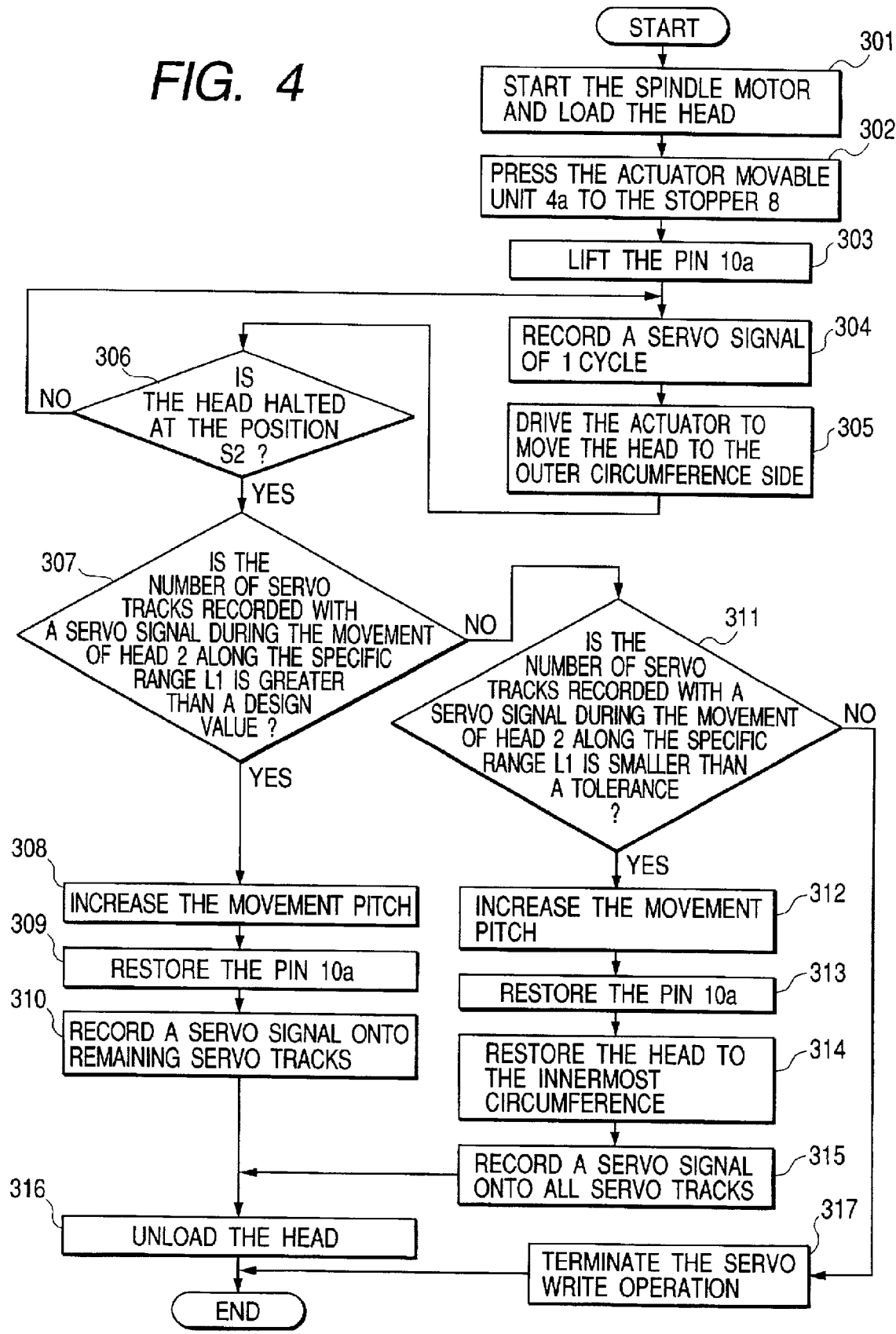
FIG. 4 is a flowchart showing the operation of the magnetic disk apparatus.

The following description explains a procedure for recording a servo signal in the magnetic disk apparatus implemented by this embodiment by using the intermediate stopper 10 with reference to a flowchart shown in FIG. 4. The magnetic disk apparatus provided by this embodiment adopts a self servo write system, whereby the apparatus itself executes control of positioning the actuator 13 on the basis of a signal reproduced by the head 2 provided in the apparatus to write a servo signal into the magnetic disk 1 without using an external write apparatus.

As shown in the figure, the flowchart begins with a step 301 at which the spindle motor is started to rotate the magnetic disk 1 at a stable speed and the head 2 is loaded from the ramp mechanism 7 onto the magnetic disk 1. Then, at the next step 302, the head 2 is moved to the inner circumference side till the stopper contact unit 4c of the actuator movable unit 4a comes in contact with the inner circumference side stopper 8. As a result, the head 2 is positioned on the innermost circumference of the magnetic disk 1. At this point of time, at the next step 303, the pressing member 14 is driven from an external position lifts the pin 10a, placing the pin 10a in a state of protruding in the upward direction as shown in FIG. 3(b).

Then, at a next step 304, an operation to write a servo signal is started, and the driver IC 6 is operated to write a servo signal of 1 cycle onto the magnetic disk 1 by means of the head 2. At a step 305, the actuator 13 is driven to move the head 2 to the outer circumference side by 1 step. The operations to write a servo signal of 1 cycle and move the head 2 in an offset movement are carried out repeatedly to spread the servo signal in the radial direction toward an outer circumference. By repeating the writing and the offset movement, the stopper contact unit 4c of the actuator movable unit 4a has moved in the specific range L1 from a position s1 in contact with the inner circumference side stopper 8 shown in FIG. 3(b) to a position s2 in contact with the pin 10a. At the position s2, since the stopper contact unit 4c is halted by the pin 10a, the head 2 cannot be moved further to the outer circumference direction even if such an attempt is made. Thus, this halted state of the head 2 can be detected by a signal read out by the head 2 itself, at a step 306.

In the case of a self servo write operation, the head 2 is shifted in an offset movement based on the amplitude of a reproduction signal. As a result, dimensional variations of the recording/reproducing device appear as variations in pitch to move the head 2. In the case of a contemporary magnetic disk apparatus with a high track density, the recording/reproducing device is designed to have a width of several hundreds of nm. Thus, the ratio of a variation in dimension to the design value of the dimension of the recording/reproducing device increases substantially in comparison with the ratio of the dimensional variation to the dimensional design value for the inner circumference side stopper 8 and in comparison with the same ratio for the intermediate stopper 10. The width hard variations of the recording/reproducing device are much reflected as hard variations in servo track count representing the number of servo tracks recorded with a servo signal between the positions s1 and s2 at which the stopper contact unit. 4c is in contact with the inner circumference side stopper 8 and the pin 10a respectively. To be more specific, the number of servo tracks written during the movement of the head 2 over the specific range L1 in a magnetic disk apparatus having a recording/reproducing device with a small width is greater than that for a magnetic disk apparatus having a recording/reproducing device with a large width.

As the head 2 itself detects a halted state thereof, the flow of the operation goes on to a step 307 to determine whether the number of servo tracks recorded with a servo signal up to this point of time, that is, recorded with a servo signal during the movement of the head 2 along the specific range L1, is greater than a design value set in advance. The compared number of servo tracks has been stored in a memory.

If the number of servo tracks recorded with a servo signal is found greater than the design value, the flow of the operation goes on to a step 308 at which the following head movement pitch is set at a value greater than the pitch used so far. Then, at the next step 309, the pressing member 14 is pulled downward to place the pin 10a at a lower position. Subsequently, at the next step 310, a servo signal is recorded onto remaining servo tracks in the unrecorded area of the magnetic disk 1.

If the number of servo tracks recorded with a servo signal is found smaller than the design value, the following head movement pitch is set at a value smaller than the pitch used so far at a step 312, the pressing member 14 is pulled downward to place the pin 10a at a lower position at a step 313, the head 2 is returned to the position of the inner circumference side stopper 8 at a step 314, and a servo signal is recorded onto the entire surface of the magnetic disk 1 starting with the innermost circumference at a step 315.

When the processing to record a servo signal onto the magnetic disk 1 is completed, the flow of the operation goes on to a step 316 at which the head 2 is unloaded and returned to the ramp mechanism 7.

If the number of servo tracks recorded with a servo signal in the specific range L1 is largely smaller than the design tolerance, it is determined that the dimension of the recording/reproducing device of the head 2 is not within the design tolerance, and the servo write operation is ended at a step 317.

As is obvious from the procedure described above, the shorter the distance between the positions s1 and s2, the earlier the time at which the head movement pitch can be corrected. As described above, the position s1 is a position at which the head 2 starts the operation to record a servo signal. On the other hand, the position s2 is a position at which the stopper contact unit 4c is in contact with the pin 10a.

In accordance with the procedure described above, an effect of any existing dimensional variation of the recording/reproducing device employed in the head 2 on a servo track pitch can be detected and corrected. Thus, servo tracks can be laid out on the surface of a disk with a high degree of efficiency. Since a head movement pitch can be corrected at a stage preceding an operation to record a servo signal on the entire surface of the disk, the essential throughput for recording a servo signal can be increased.

Figure 5:
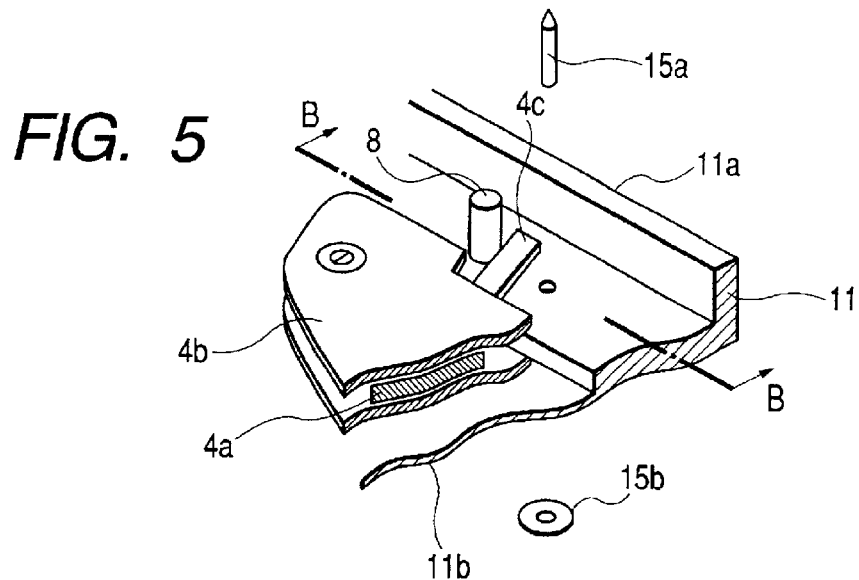
FIG. 5 is a perspective view of a cross section of components constituting a magnetic disk apparatus implemented by a second embodiment of the present invention.
Figure 6:
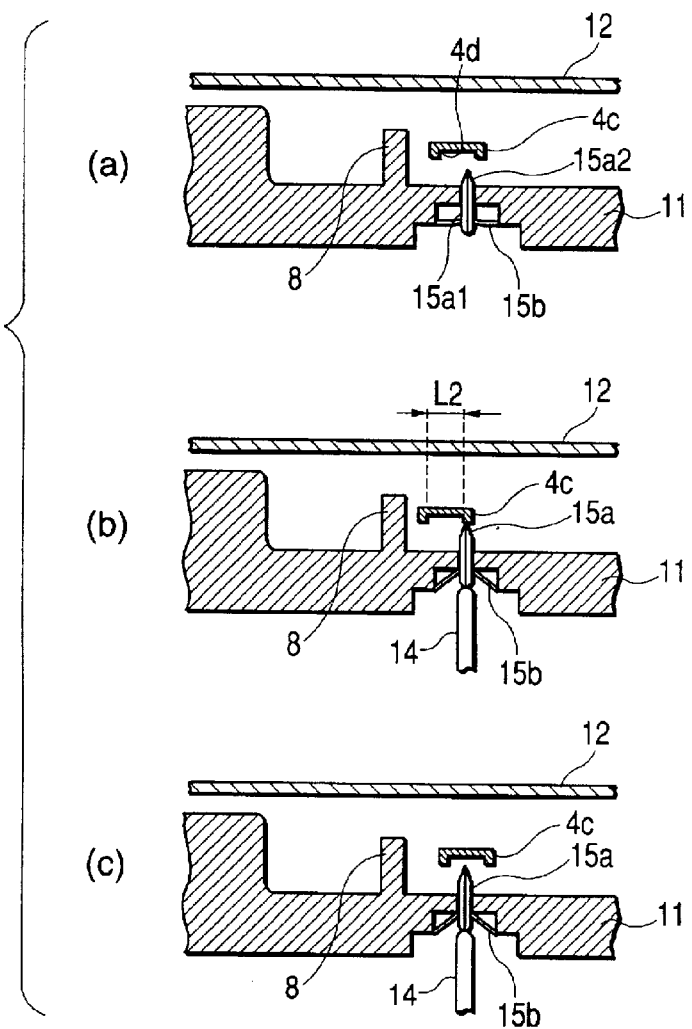
FIG. 6 is an explanatory diagram used for describing operations taking place on a cross section B—B shown in FIG. 5.

Next, a second embodiment of the present invention is explained by referring to FIGS. 5 and 6. Only differences between the second and first embodiments are explained. What is omitted from the explanation of the second embodiment is the same as the first embodiment.

A head position detecting mechanism 15 constituting the intermediate stopper comprises a probe 15a and a diaphragm like elastic member 15b. The probe 15a comprises a conductive member 15a1, which is a conductive bar, and a sheath member 15a2. The sheath member 15a2 made of insulating resin covers the conductive member 15a1. One end of the probe 15a is supported by the diaphragm like elastic member 15b positioned outside the case 11 through a hole 11c bored through the case 11. The diaphragm like elastic member 15b allows the probe 15a to move in a direction normal to the surface of the magnetic disk 1 while maintaining the hermetical sealing of the space inside the case 11.

FIG. 6(a) is a diagram showing a state of the head position detecting mechanism 15 with the magnetic disk apparatus put in an ordinary operation. In the ordinary operation, the probe 15a is held in a state of being pulled downward by a force of the diaphragm like elastic member 15b. In this state, the stopper contact unit 4c of the actuator movable unit 4a is never brought into contact with the probe 15a.

FIGS. 6(b) and 6(c) shows the state of the probe 15a at a stage of recording a servo signal. When a servo signal is recorded, the head 2 is loaded on the magnetic disk 1 and moved to the innermost circumference of the magnetic disk 1. At the stage the head 2 is moved to the innermost circumference, a pushing member 14 is lifted from an external position, pressing the probe 15a in the upward direction. This operation places the probe 15a at a position at which the stopper contact unit 4c can come in contact with the probe 15a as shown in FIG. 6(b). The pressing member 14 is conductive and connected to a constant potential level by a resistor. When the probe 15a is brought into contact with the stopper contact unit 4c, the electric potential of the pressing member 14 changes. Thus, an electric potential change observed in the pressing member 14 indicates that the probe 15a has been brought into contact with the stopper contact unit 4c.

In the case of this embodiment, a dent 4d is formed along a segment L2 on the lower side of the stopper contact unit 4c. When the probe 15a is placed in the area of the dent 4d of the stopper contact unit 4c, the end of the probe 15a is separated from the stopper contact unit 4c as shown in FIG. 6(c). It should be noted that FIG. 6(b) shows a state in which the stopper contact unit 4c is not in contact with the inner circumference side stopper 8 in order to make the explanation simple. In actuality, however, the stopper contact unit 4c is in contact with the inner circumference side stopper 8 and the head 2 is positioned on the innermost circumference of the magnetic disk 1.

When the head 2 is moved from the innermost circumference toward an outer circumference in a process of creating servo tracks, an electric potential change occurring in the pressing member 14 is monitored. As the probe 15a is brought into contact with the stopper contact unit 4c, a monitored electric potential change occurring in the pressing member 14 indicates that the probe 15a has been brought into contact with the stopper contact unit 4c. Thus, the segment L2 can be recognized as the specific range. The segment L2 can have a width equal to the width of the specific range L1 in the first embodiment.

A method for detecting and correcting a servo track pitch is based on the number of servo tracks on which a servo signal was recorded during the movement of the head along the segment L2 in the same way as the first embodiment. As a result, it is possible to obtain the same effects as the first embodiment.

In accordance with the present invention, a servo signal can be written into a servo track without using an external write apparatus. As a result, it is possible to provide a magnetic disk apparatus capable of writing a predetermined servo signal onto the surface of a magnetic disk with a high degree of reliability and a high degree of efficiency even if dimensional variations of a recording/reproducing device of a head exist, and provide a servo signal recording method adopted by the magnetic disk apparatus.

What is claimed is:

1. A magnetic disk apparatus comprising:
   a head having a recording/reproducing device for writing and reading out a servo signal onto and from a magnetic disk;
   an actuator having a head arm for supporting and moving said head to a position above said magnetic disk in a servo track movement operation and a driving means for driving said head arm;
   a range limiting stopper for limiting a movable range of said actuator;
   a range specifying stopper for setting a specific range of said actuator in said movable range of said actuator; and
   a control unit for writing a servo signal into said specific range at servo track movement pitch based on servo tracks recorded with said servo signal, correcting said servo track movement pitch on the basis of the number of servo tracks in said specific range and executing control to write said servo signal at corrected servo track movement pitch;
   wherein, if a result of comparison of the number of servo tracks recorded with said servo signal in said specific range with a predetermined value indicates that the number of servo tracks is greater than said predetermined value, said servo track movement pitch is increased and a servo signal is recorded onto areas outside said specific range at said increased servo track movement pitch.

2. A magnetic disk apparatus comprising:
   a head having a recording/reproducing device for writing and reading out a servo signal onto and from a magnetic disk;
   an actuator having a head arm for supporting and moving said head to a position above said magnetic disk in a servo track movement operation and a driving means for driving said head arm;
   a range limiting stopper for limiting a movable range of said actuator;
   a range specifying stopper for setting a specific range of said actuator in said movable range of said actuator; and
   a control unit for writing a servo signal into said specific range at servo track movement pitch based on servo tracks recorded with said servo signal, correcting said servo track movement pitch on the basis of the number of servo tracks in said specific range and executing control to write said servo signal at corrected servo track movement pitch;
   wherein said specific range is a predetermined range in said movable range of said actuator starting from an innermost circumference in said movable range.

3. A magnetic disk apparatus according to claim 2, wherein said range limiting stopper also serves as a portion of said range specifying stopper.

4. A magnetic disk apparatus according to claim 2, wherein said specific range is a set range smaller than 30% of an entire area in which a servo signal is to be recorded.

5. A magnetic disk apparatus comprising:
- a head having a recording/reproducing device for writing and reading out a servo signal onto and from a magnetic disk;
- an actuator having a head arm for supporting and moving said head to a position above said magnetic disk in a servo track movement operation and a driving means for driving said head arm;
- a range limiting stopper for limiting a movable range of said actuator;
- a range specifying stopper for setting a specific range of said actuator in said movable range of said actuator; and
- a control unit for writing a servo signal into said specific range at servo track movement pitch based on servo tracks recorded with said servo signal, correcting said servo track movement pitch on the basis of the number of servo tracks in said specific range and executing control to write said servo signal at corrected servo track movement pitch;
- wherein said range specifying stopper includes an intermediate stopper; and
- a state of contact of said actuator with said intermediate stopper is detected from said intermediate stopper.

6. A servo signal recording method for recording a servo signal into a specific range of a magnetic disk in a magnetic disk apparatus having a head having a recording/reproducing device for writing and reading out a servo signal onto and from said magnetic disk and an actuator for moving said head to a position above said magnetic disk in a servo track movement operation, said servo signal recording method comprising the steps of:
- writing said servo signal into said specific range at servo track movement pitch based on servo tracks recorded with a servo signal;
- detecting the number of servo tracks recorded with a servo signal in said specific range;
- comparing said detected number of servo tracks recorded with a servo signal with a set value;
- correcting said servo track movement pitch at which said servo signal is written into said specific range on the basis of a comparison result; and
- writing said servo signal at corrected servo track movement pitch;
- wherein, if a result of comparison of the number of servo tracks recorded with said servo signal in said specific range with a predetermined value indicates that the number of servo tracks is greater than said predetermined value, said servo track movement pitch is increased and a servo signal is recorded onto areas outside said specific range at said increased servo track movement pitch.

7. A servo signal recording method for recording a servo signal into a specific range of a magnetic disk in a magnetic disk apparatus having a head having a recording/reproducing device for writing and reading out a servo signal onto and from said magnetic disk and an actuator for moving said head to a position above said magnetic disk in a servo track movement operation, said servo signal recording method comprising the steps of:
- writing said servo signal into said specific range at servo track movement pitch based on servo tracks recorded with a servo signal;
- detecting the number of servo tracks recorded with a servo signal in said specific range;
- comparing said detected number of servo tracks recorded with a servo signal with a set value;
- correcting said servo track movement pitch at which said servo signal is written into said specific range on the basis of a comparison result; and
- writing said servo signal at corrected servo track movement pitch;
- wherein, if a result of comparison of the number of servo tracks recorded with said servo signal in said specific range with a predetermined value indicates that the number of servo tracks is smaller than said predetermined value, said servo track movement pitch is reduced and a servo signal is recorded onto areas outside said specific range at said reduced servo track movement pitch.

8. A servo signal recording method for recording a servo signal into a specific range of a magnetic disk in a magnetic disk apparatus having a head having a recording/reproducing device for writing and reading out a servo signal onto and from said magnetic disk and an actuator for moving said head to a position above said magnetic disk in a servo track movement operation, said servo signal recording method comprising the steps of:
- writing said servo signal into said specific range at servo track movement pitch based on servo tracks recorded with a servo signal;
- detecting the number of servo tracks recorded with a servo signal in said specific range;
- comparing said detected number of servo tracks recorded with a servo signal with a set value;
- correcting said servo track movement pitch at which said servo signal is written into said specific range on the basis of a comparison result;
- writing said servo signal at corrected servo track movement pitch;
- setting said specific range as a predetermined range in said movable range of said actuator starting from an innermost circumference in said movable range; and
- detecting the number of servo tracks in said specific range.

9. A servo signal recording method for recording a servo signal into a specific range of a magnetic disk in a magnetic disk apparatus having a head having a recording/reproducing device for writing and reading out a servo signal onto and from said magnetic disk and an actuator for moving said head to a position above said magnetic disk in a servo track movement operation, said servo signal recording method comprising the steps of:
- writing said servo signal into said specific range at servo track movement pitch based on servo tracks recorded with a servo signal;
- detecting the number of servo tracks recorded with a servo signal in said specific range;
- comparing said detected number of servo tracks recorded with a servo signal with a set value;
- correcting said servo track movement pitch at which said servo signal is written into said specific range on the basis of a comparison result;
- writing said servo signal at corrected servo track movement pitch;
- comparing the number of detected servo tracks with a tolerance of set values; and
- halting an operation to write a servo signal if the number of detected servo tracks is found greater than said tolerance.

* * * * *